United States Patent [19]

Smith et al.

[11] Patent Number: 5,219,596
[45] Date of Patent: Jun. 15, 1993

[54] COMPOSITION AND METHOD THEREOF FOR INCREASING MILK PRODUCTION IN DAIRY CATTLE

[75] Inventors: Steven I. Smith, Zimmerman; John A. Foley, Jr., Minneapolis, both of Minn.

[73] Assignee: Cargill, Incorporated, Minneapolis, Minn.

[21] Appl. No.: 896,301

[22] Filed: Jun. 10, 1992

Related U.S. Application Data

[63] Continuation of Ser. No. 572,755, Aug. 24, 1990, Pat. No. 5,145,695.

[51] Int. Cl.⁵ ............................................. A23K 1/00
[52] U.S. Cl. ................................... 426/2; 426/72; 426/73; 426/74; 426/623; 426/630; 426/636; 426/656; 426/807
[58] Field of Search ...................... 426/2, 72, 74, 623, 426/630, 636, 656, 807, 73

[56] References Cited

U.S. PATENT DOCUMENTS

| | | | |
|---|---|---|---|
| 3,168,888 | 2/1965 | Brodrick | 426/2 |
| 3,263,651 | 8/1966 | Anderson | 426/2 |
| 3,925,560 | 12/1975 | Scott et al. | 426/2 |
| 4,118,513 | 10/1978 | Braund et al. | 426/2 |
| 4,175,121 | 11/1979 | Mantha | 426/2 |
| 4,181,708 | 1/1980 | Dannelly | 424/19 |
| 4,186,213 | 1/1980 | Burroughs et al. | 426/2 |
| 4,248,899 | 2/1981 | Lyon et al. | 426/93 |
| 4,642,317 | 2/1987 | Palmquist et al. | 514/558 |
| 4,824,679 | 4/1989 | Freeman | 426/2 |
| 5,145,695 | 9/1992 | Smith et al. | 426/807 |

OTHER PUBLICATIONS

T. S. Neudoerffer, D. B. Duncan and F. D. Horney, "The Extent of Release of Encapsulated Methionine in the Intestine of Cattle," 25 *Br. J. Nutr.*, pp. 333-341 (1971).

T. C. Jenkins and D. L. Palmquist, "Effect of Added Fat and Calcium on in Vitro Formation of Insoluble Fatty Acid Soaps and Cell Wall Digestibility," 55 *Journal of Animal Science*, pp. 957-963 (1982).

T. C. Jenkins and D. L. Palmquist, "Effect of Fatty Acids or Calcium Soaps on Rumen and Total Nutrient Digestibility of Dairy Rations," 67 *J. Dairy Sci.*, pp. 978-986 (1984).

M. S. Aseltine, "Bypass Protein Requirements of Dairy Cows Reviewed," 17 *Feedstuffs*, pp. 16-30 (1989).

"Bypass Protein in Dairy Rations," *Proceedings of Dairy Research Conference*, Jan. 26, 1990, University of Minnesota.

Morrison, "Feeds and Feeding," Morrison Publishing Co., Ithaca, New York, pp. 627-635, 1096, 1103, 1115-1119 and 1133-1145 (1957).

*Primary Examiner*—R. B. Penland
*Attorney, Agent, or Firm*—Fitch, Even, Tabin & Flannery

[57] ABSTRACT

A composition and method thereof for increasing milk production in dairy cattle by balancing the essential amino acids via a particular complete feed, concentrate, or blender or base mix form of the composition which delivers essential amino acids post ruminally, wherein the composition generally comprises wheat middlings; corn; soybean meal; corn gluten meal; distillers grains or distillers grains with solubles; blood meal; fat; macrominerals, which include calcium, phosphorus, magnesium, potassium, sodium, chlorine and sulfur; trace minerals, which include cobalt, copper, iodine, iron, manganese, selenium and zinc; and vitamins, which include vitamin A, vitamin D and vitamin E.

16 Claims, No Drawings

COMPOSITION AND METHOD THEREOF FOR INCREASING MILK PRODUCTION IN DAIRY CATTLE

This is a continuation of application Ser. No. 07/572,755, filed Aug. 24, 1990, U.S. Pat. No. 5,145,695.

BACKGROUND OF THE INVENTION

Field of the Invention

This invention relates generally to a method and composition thereof for increasing the milk production in dairy cattle.

Increasing the milk production of lactating dairy cattle is an ongoing challenge facing the dairy industry. The challenge is complicated by the fact that, even though a dairy cow's diet can meet her requirement for crude protein, she may still lack some essential amino acids at the levels required for high milk production. One cause of this dilemma is the digestive system of the dairy cow herself.

Ingested feed first passes into the reticulorumen, where it is subject to anaerobic microbial fermentation. This microbial fermentation begins the digestive process and gives the ruminant the ability to utilize fibrous feeds that the mammalian system alone cannot break down due to the lack of necessary enzyme systems. The host animal subsequently meets her own nutrient needs by utilizing the by-products of this extensive fermentation, along with any undigested feed residues and the resultant microbial mass that passes from the rumen.

This microbial activity is certainly an advantage to the ruminant, because it allows them to benefit from feeds for which there is little competition from non-ruminants. However, the microbial intervention limits our ability to provide supplemental nutrients to the ruminant, because many desirable nutrients, such as proteins and amino acids, will be metabolized before they reach a site where they can be absorbed and utilized by the host animal.

A large portion of dietary protein is broken down in the rumen to soluble peptides and amino acids. Some of these peptides and amino acids are utilized by the microbial population directly, but most are further degraded to form ammonia. This ammonia is then used by the microbial population for de Dovo synthesis of amino acids to meet their own needs. In many cases, this microbial intervention results in the improvement of the amino acid profile being offered to the host.

Many techniques, formulations and the like have been tried in the past to protect the useful products from further degradation in the rumen. Encapsulation of methionine is discussed in Neudoerffer, Duncan and Horney, "The Extent of Release of Encapsulated Methionine in the Intestine of Cattle," 25 *British Journal of Nutrition.* p.333–341 (1971). Another method that has been tried is to supplement the feed with fatty acids in the form of calcium salts without reducing fiber digestibility, which is disclosed in U.S. Pat. No. 4,642,317 to Palmquist et al. In U.S. Pat. No. 4,248,899 to Lyon et al., a feed supplement is prepared from protein extracted from a leafy green source. The protein is then combined with a triglyceride lipid material.

These methods involve extensive processing. It is highly desirable to have a more simple, economical and productive method for supplying sufficient quantities of essential amino acids in the proper balance to the small intestines where absorption takes place.

SUMMARY OF THE INVENTION

This invention relates generally to a method and composition thereof for increasing the milk production in dairy cattle. By feeding the cattle a particular feed composition which delivers an improved balance of essential amino acids post-ruminally, the cow's milk production is increased. This invention provides a unique approach to feed formulation. The invention is a formulation of dairy feedstuffs, balanced to deliver necessary amino acid requirements at a particular point in the cow's digestive system, rather than, as in the past, just attempting to meet crude protein requirements of the animal. By properly adjusting a particular feed composition to deliver essential amino acids in balance post-ruminally overall production is enhanced and deficiencies and excesses are minimized.

The composition can be can be used in several forms: complete feed form, concentrate form, blender form and base mix form. If the composition is in the form of a complete feed, the percent protein level is about 14 to about 24 percent; whereas, if the composition is in the form of a concentrate, the protein level is about 32 to about 48 percent, if the composition is in the form of a blender, the protein level in the composition is about 24 to about 26 percent; and if the composition is in the form of a base mix, the protein level in the composition is about 55 to about 65 percent.

The complete feed form composition generally contains wheat middlings, corn, soybean meal, corn gluten meal, distillers grains or distillers grains with solubles, blood meal, salt, macro-minerals, trace minerals and vitamins. Alternative ingredients would commonly include, but not be restricted to meat and bone meal, fat, sunflower meal, malt sprouts and soybean hulls.

The concentrate form composition generally contains wheat middlings, corn, soybean meal, corn gluten meal, distillers grains or distillers grains with solubles, blood meal, salt, macro-minerals, trace minerals and vitamins. Alternative ingredients would commonly include, but not be restricted to, meat and bone meal, fat, sunflower meal and malt sprouts.

The blender form composition generally contains wheat middlings, corn gluten meal, distillers grains or distillers grains with solubles, blood meal, salt, macro-minerals, trace minerals and vitamins. Alternative ingredients would commonly include, but not be restricted to, meat and bone meal, corn, soybean meal, fat, sunflower meal, malt sprouts and soybean hulls.

DETAILED DESCRIPTION OF THE PREFERRED EMBODIMENTS

The base form composition generally contains wheat middlings, corn gluten meal, distillers grains or distillers grains with solubles and blood meal. Alternative ingredients would commonly include, but are not restricted to, soybean meal, meat and bone meal, sunflower meal, malt sprouts, fat, macro-minerals, trace minerals and vitamins.

The invention herein is a method and composition therefore for increasing milk production in dairy cattle.

By feeding this particular composition to ruminants, essential amino acids are delivered post-ruminally in a particular balance. The key amino acids are lysine, methionine, histidine and phenylalanine. These amino acids are delivered post-rumenally to the abomasum, at
} which point they are subjected to mammalian digestion that would result in their being absorbed and made available to the mammary gland in proper quantities and proportions to support enhanced milk production.

The composition can be used in several forms: complete feed form, concentrate form, blender form and base mix form. By complete feed form it is meant that the feed represents the cow's entire grain ration. By concentrate form it is meant that the feed will be used as the primary supplemental protein source and would normally be fed with grain to meet the cow's protein needs. By blender form it is meant that the feed will be mixed in approximately a 50:50 ratio with grain to form the complete grain ration. The base mix form is similar to the concentrate form, but is typically higher in protein content and is used at lower inclusion rates. The base mix form will be a primary, but often not the sole source of supplemental protein.

The grains fed with the blender, concentrate and base mix forms of the composition include, but are not limited to, corn, barley, oats, millet, rice, sorghum and wheat, and intakes of the total grain ration will typically range from 6 to about 37 lb/day. If the composition is in the complete feed form, the percent protein level is about 14 to about 24 percent; whereas, if the composition is in the form of a concentrate, the protein level is about 32 to about 48 percent; if the composition is in the form of a blender, the protein level in the composition is about 24 to about 26 percent; and if the composition is in the form of a base mix, the protein level in the composition is about 55 to about 65 percent.

Total supply of the key essential amino acids post-ruminally, whether the ration is based upon the complete feed form, the concentrate form, the blender form or base form of the invention, should be in the amount of about 69 to about 332 grams/day lysine, about 20 to 105 grams/day methionine, about 22 to 113 grams/day histidine, and about 44 to 225 grams/day phenylalanine. These requirements will depend upon body weight and level of production as shown in Table 1 and the following equations:

Lysine requirement (g)=8.23+(147.13×MP) +(0.02458 ×BW);

Methionine requirement (g)=1.8017+(47.244 ×MP)+(0.00558×BW);

Histidine requirement (g)=2.348+(50.514×MP)+(0.007166×BW); and

Phenylalanine requirement (g)=3.883+(101.62× MP)+(0.01216×BW);

Where:
MP=Kg. milk protein
BW=Kg. body weight.

TABLE 1

| 4% FCM* (kg) | Milk protein (kg) | Post-rumenal Amino Acid Requirements | | | |
|---|---|---|---|---|---|
| | | Post-rumenal amino acid requirement (g/day) | | | |
| | | Lys | Met | His | Phe |
| Body weight: 600 kg | | | | | |
| Milk protein: 3.5% | | | | | |
| 20 | 0.7 | 125.9 | 38.2 | 42.0 | 82.3 |
| 30 | 1.05 | 177.4 | 54.7 | 59.7 | 117.9 |
| 40 | 1.4 | 228.9 | 71.3 | 77.4 | 153.4 |
| 50 | 1.75 | 280.4 | 87.8 | 95.0 | 189.9 |
| 60 | 2.1 | 331.9 | 104.4 | 112.7 | 224.6 |
| Body weight: 400 kg | | | | | |

TABLE 1-continued

| 4% FCM* (kg) | Milk protein (kg) | Post-rumenal Amino Acid Requirements | | | |
|---|---|---|---|---|---|
| | | Post-rumenal amino acid requirement (g/day) | | | |
| | | Lys | Met | His | Phe |
| Milk protein: 3.5% | | | | | |
| 10 | 0.35 | 69.5 | 20.6 | 22.9 | 44.3 |
| 20 | 0.7 | 121.0 | 37.1 | 40.6 | 79.9 |
| 30 | 1.05 | 172.5 | 53.6 | 58.2 | 115.4 |
| 40 | 1.4 | 224.0 | 70.2 | 75.9 | 151.0 |
| 50 | 1.75 | 275.5 | 86.7 | 93.6 | 186.6 |

*4% fat corrected milk - (0.4) (kg milk) + (15) (kg of milk fat)

This requirement can be met by essential amino acids from two sources, protein of microbial origin, which was synthesized in the rumen, and from undegraded intake protein. Microbial crude protein (MCP) synthesis is primarily a function of microbial growth, which in turn is dependent upon the amount of fermentable energy in the diet. The level of fermentable energy can be estimated using the method of Tilley and Terry, "A Two Stage Technique for the In Vitro Digestion of Forage Crops," *J. of the British Grassland Society*, 18:104-111 (1963). This fermentable energy can be expressed as non-fat net energy of lactation ($NFNE_1$). The technique referenced above can be applied to determine the amount of net energy of lactation ($NE_1$) that the total daily ration provides from components other than fat, that is, non-fat net energy of lactation. It is important to exclude fat, since the rumen microbial population can derive little energy from fat to support their growth. This value for $NFNE_1$ (Mcal/kg) can then be applied to estimate microbial amino acid flow as follows:

MCP(g)=6.25×(−19.374+(12.52×$NFNE_1$))

Only 80 percent of MCP is estimated to be true amino acid protein, so microbial amino acids (MAA) production would be:

MAA (g)=0.8×MCP.

To estimate the flow of individual amino acids of microbial origin, the amino acid composition of microbial protein is applied to the estimate of total MAA. Microbial protein is approximately 9.30 grams/100g lysine, approximately 2.60 grams/100g methionine, approximately 2.30 grams/100g histidine and approximately 5.0 grams/100g phenylalanine. The quantity of essential amino acids that pass into the duodenum from undegraded intake protein can be estimated using techniques described by Craig and Broderick, "Amino Acids Released During Protein Degradation By Rumen Microbes," *Journal of Animal Science*. 58:436-443 (1984). Both of these techniques are used and incorporated herein by reference.

The composition in the complete feed form contains about 0.92 to about 5.7 grams/pound (grams/lb. air dried basis) feed of undegraded lysine, preferably about 1.9 to about 2.34 grams/lb. feed of undegraded lysine; about 0.16 to about 2.2 grams/lb. feed of undegraded methionine, preferably about 0.84 to about 0.92 grams/lb. feed of undegraded methionine; about 0.42 to about 3.0 grams/lb. feed of undegraded histidine, preferably about 0.66 to about 1.12 grams/lb. feed of undegraded histidine: about 0.70 to about 5.5 grams/lb. feed of undegraded phenylalanine, preferably about 1.27 to about 2.02 grams/lb. feed of undegraded phenylalanine.

The composition in concentrate form contains about 3.2 to about 8.2 grams/lb. (air dried basis) feed of undegraded lysine, preferably about 4.13 to about 6.97 grams/lb. feed of undegraded lysine; about 0.9 to about 2.8 grams/lb. feed of undegraded methionine, preferably about 1.30 to about 1.97 grams/lb. feed of undegraded methionine; about 1.3 to about 5.9 grams/lb. feed of undegraded histidine, preferably about 1.94 to about 3.09 grams/lb. feed of undegraded histidine; about 2.5 to about 9.0 grams/lb. feed of undegraded phenylalanine, preferably about 3.54 to about 5.69 grams/lb. feed of undegraded phenylalanine.

The composition in blender form contains about 3.3 to about 4.0 grams/lb. (air dried basis) feed of undegraded lysine, preferably about 3.4 to about 3.8 grams/lb. feed of undegraded lysine; about 0.9 to about 1.5 grams/lb. feed of undegraded methionine, preferably about 1.0 to about 1.28 grams/lb. feed of undegraded methionine; about 1.4 to about 2.9 grams/lb. feed of undegraded histidine, preferably about I.5 to about 1.9 grams/lb. feed of undegraded histidine; about 2.5 to about 4.2 grams/lb. feed of undegraded phenylalanine, preferably about 2.7 to about 3.5 grams/lb. feed of undegraded phenylalanine.

The composition in base mix form contains about 6.7 to about 17.0 grams/lb. (air dried basis) feed of undegraded lysine, preferably about 11.0 to about 15.5 grams/lb. feed of undegraded lysine; about 1.6 to about 5.1 grams/lb. feed of undegraded methionine, preferably about 2.8 to about 4.3 grams/lb. feed of undegraded methionine; about 2.6 to about 9.5 grams/lb. feed of undegraded histidine, preferably about 5.2 to about 9.0 grams/lb. of undegraded histidine; about 4.7 to about 14.8 grams/lb. feed of undegraded phenylalanine, preferably about 9.8 to about 12.9 grams/lb. feed of undegraded phenylalanine.

The complete feed form composition typically contains the following ingredients: wheat middlings; soybean meal; corn gluten meal; distillers grains or distillers grains with solubles; blood meal; macrominerals, which include calcium, phosphorus, magnesium, potassium, sodium, chlorine and sulfur, trace minerals, which include cobalt, copper, iodine, iron, manganese, selenium and zinc; and vitamins, which include vitamin A, vitamin D and vitamin E. Optional ingredients in the complete feed form composition would commonly include, but not be restricted to fat, corn, meat and bone meal, brewers grains, sunflower meal, malt sprouts, soybean hulls or mixtures thereof.

The concentrate form of the composition typically contains the following ingredients: wheat middlings, soybean meal, corn gluten meal, distillers grains or distillers grains with solubles, blood meal, macro-minerals, trace minerals, and vitamins. Optional ingredients in the concentrate form of the composition would commonly include, but not be restricted to fat, corn, meat and bone meal, sunflower meal, malt sprouts, brewers grains or mixtures thereof.

The blender form of the composition typically contains the following ingredients: wheat middlings, corn gluten meal, distillers grains or distillers grains with solubles, blood meal, macro-minerals, trace minerals, and vitamins. Optional ingredients in the concentrate form of the composition would commonly include, but not be restricted to meat and bone meal, sunflower meal, corn, soybean meal, fat, malt sprouts, brewers grains or mixtures thereof.

The base mix form of the composition typically contains, but is not restricted to, the following ingredients: wheat middlings meal corn gluten, distillers grains or distillers grains with solubles and blood meal and vitamins. Optional ingredients in the base mix form of the composition would commonly include, but not be restricted to, soybean meal, fat, macro-minerals, trace minerals, vitamins meat and bone meal, sunflower meal, malt sprouts, brewers grains or mixtures thereof.

The complete feed form of the composition contains about 7 to about 56 weight percent corn, about 20 to about 50 weight percent wheat middlings, about 0.25 to about 2.5 weight percent soybean meal, about 5 to about 19 weight percent distillers grains or distillers grains with solubles, about 5.0 to about 8.0 weight percent blood meal, about 0.5 to about 0.10 weight percent trace minerals, about 2.0 to about 5.1 weight percent macro-minerals and about 2.0 to about 7.0 weight percent corn gluten meal. The complete feed form composition may contain other ingredients including, but not limited to, fat, soybean hulls and malt sprouts. If fat is used, it is employed in an amount of greater than zero to about 3.5 weight percent. Malt sprouts are used in the amount of about greater than zero to about 30 weight percent. The soybean hulls are used in an amount of about greater than zero to about 10 weight percent.

The concentrate form of the composition contains about 18 to about 50 weight percent wheat middlings, about 3.0 to about 16.0 weight percent soybean meal, about 2.5 to about 6.0 weight percent macro-minerals, about 10 to about 20 weight percent distillers grains or distillers grains with solubles, about 10.0 to about 28.0 weight percent blood meal, about 0.3 to about 0.5 weight percent trace minerals, and about 5.0 to about 18.0 weight percent corn gluten meal. The concentrate form composition may contain other ingredients including, but not limited to, malt sprouts, corn, meat and bone meal and fat. If desired corn is used in an amount greater than zero to about 5.0 weight percent, malt sprouts are used in the amount of about greater than zero to about 10 weight percent; and meat and bone meal, if employed, in an amount of greater than zero to about 3.5 weight percent. Fat can be used in am amount of greater than zero to about 5.7 weight percent.

The blender form of the composition contains, about 20 to about 50 weight percent wheat middlings, about 4.4 to about 6.9 weight percent macro-minerals, about 10 to about 20 weight percent distillers grains or distillers grains with solubles, about 9.0 to about 15.0 weight percent blood meal, about 0.05 to about 0.2 weight percent trace minerals, and about 4.0 to about 8.0 weight percent corn gluten meal. The blender feed form composition may contain other ingredients including, but not limited to, malt sprouts, corn, soybean meal, meat and bone meal and fat. Malt sprouts are used in the amount of about greater than zero to about 10 weight percent. Corn can be used in an amount greater than zero to about 30 weight percent; soybean meal can be used in an amount greater than zero to about 10 weight percent; meat and bone meal can be used in an amount greater than zero to about 3.5 weight percent; and fat can be used in an amount greater than zero to about 3.5 weight percent.

The base mix form of the composition contains about 5.0 to about 10 weight percent distillers grains or distillers grains with solubles, about 40.0 to about 54.0 weight percent blood meal, and about 15.0 to about 22.0 weight percent corn gluten meal. The base mix form composition may contain other ingredients including, but not limited to, malt sprouts, wheat middlings, meat and bone meal, fat, macro-minerals, and trace minerals. The optional ingredients are used in the following amounts: malt sprouts are used in the amount of greater than zero to about 10 weight percent, greater than zero to about 35 weight percent wheat middlings, greater than zero to about 7.5 weight percent meat and bone meal, greater than zero to about 4.0 weight percent fat, greater than zero to about 4.0 weight percent macro-minerals, and greater than zero to about 0.6 weight percent trace minerals.

It should be noted that there are four primary methods to produce blood meal, which are the following: ring drying, flash drying, cook or vat drying and spray drying. Ring and flash dried blood meal are the most consistent in quality of those types suitable to deliver key essential amino acids post-ruminally are preferably used.

When the composition is fed in conjunction with a roughage base of corn silage versus legume or grass, the composition can be adjusted to best compliment the small differences in essential amino acid flow that result from the digestion of these roughage sources. With a predominately legume or grass roughage base, the post-ruminally methionine supply is less than if corn silage is used. This can be corrected if the proper level of corn gluten meal is used in the composition's formulation, whether it be in the complete feed form, the concentrate form, the blender form or base mix form.

Furthermore, to ensure the increase in milk production, all rations should be properly balanced according to recognized standards put forth in Nutrient Requirements of Dairy Cattle, Sixth Revised Edition (1988), National Research Council, National Academy Press, Washington, D.C. and by Sniffen, et al. (1988) "Balancing for Carbohydrates in Dairy Rations," Proc. 49th Minnesota Nutrition Conference. In addition, sufficient quantities of the composition, whether complete feed form, concentrate form, blender form or base mix form, must be fed to the dairy cattle to achieve a flow of essential amino acids that will meet the requirement previously described.

The composition in the complete feed form generally has a protein amount of about 14 to about 24 weight percent, a fat amount of about 2.0 to about 6.0 weight percent, a fiber maximum of about 12 weight percent, a phosphorus amount of about 0.6 to about 0.9 weight percent, a calcium amount of about 0.9 to about 1.8 weight percent, and total digestible nutrients (TDN) of at least about 71 weight percent.

The composition in the concentrate form generally has a protein amount of about 32 to about 48 weight percent, a fat amount of about 2.0 to about 9.0 weight percent, a fiber maximum of about 8 weight percent, a phosphorus amount of about 0.9 to about 1.2 weight percent, a calcium amount of about 1.3 to about 2.0 weight percent, and total digestible nutrients (TDN) of at least about 71 weight percent.

The composition in the blender form generally has a protein amount of about 24 to about 26 weight percent, a fat amount of about 2.0 to about 7.0 weight percent, a fiber maximum of about 8 weight percent, a phosphorus amount of about 1.0 to about 1.5 weight percent, a calcium amount of about 2.0 to about 3.0 weight percent, and total digestible nutrients (TDN) of at least about 71 weight percent.

The composition in the base mix form generally has a protein amount of about 57 to about 65 weight percent, a fat amount of about 2.0 to about 6.0 weight percent, a fiber maximum of about 8 weight percent, a phosphorus amount of about 0.4 to about 0.9 weight percent, a calcium amount of about 0.6 to about 1.4 weight percent, and total digestible nutrients (TDN) of at least about 69 weight percent.

The complete feed form, concentrate form, blender form and base mix form of the composition are all made in the following manner: by dry mixing ingredients at standard environmental temperatures.

The following Examples are not meant to limit the scope of the invention herein, but are for illustrative purposes only.

EXAMPLES

Example 1

The invention herein, concentrate composition A, was made by dry mixing and pelleting the following ingredients:

| Ingredient | % |
| --- | --- |
| Wheat middlings | 24.68 |
| Soybean meal (48% protein) | 70.59 |
| Salt | 0.89 |
| Calcium carbonate | 2.04 |
| Dicalcium phosphate | 1.45 |
| Vitamins/trace minerals | 0.35 |

A comparative concentrate composition, C1, was made by dry mixing and pelleting the following ingredients:

| Ingredient | % |
| --- | --- |
| Corn | 4.45 |
| Wheat middlings | 35.0 |
| Blood meal | 12.6 |
| Meat and bone meal | 0.24 |
| Malt sprouts | 7.22 |
| Soybean meal (48% protein) | 14.96 |
| Distillers grains w/solubles | 10.0 |
| Corn gluten meal | 5.37 |
| Animal fat | 5.7 |
| Salt | 0.9 |
| Calcium carbonate | 2.08 |
| Dicalcium phosphate | 0.94 |
| Vitamins/trace minerals | 0.54 |

The two compositions were fed to dairy cattle in rations based on corn, corn silage, alfalfa hay, alfalfa haylage and supplemental minerals that were properly balanced according to accepted standards. Performance of these cattle was monitored from the time they were approximately 17 days in milk to approximately 143 days in milk with the results reported in Table 2.

TABLE 2

| | Milk Production of Cows (lb. day) | | | | |
| --- | --- | --- | --- | --- | --- |
| | Days in Milk | | | | |
| Treatment | 17–30 | 31–58 | 58–86 | 87–114 | 115–143 |
| A | 69.5 | 77.8 | 76.4 | 72.2 | 68.1 |
| C1 | 77.1 | 81.8 | 82.9 | 80.0 | 78.1 |
| Advantage | 7.6 | 4.0 | 6.5 | 7.8 | 10.0 |

EXAMPLE 2

The invention herein, concentrate composition B, was made by dry mixing and pelleting the following ingredients:

| Ingredient | % |
| --- | --- |
| Wheat middlings | 6.60 |
| Soybean meal (48% protein) | 67.06 |
| Distillers grains w/solubles | 19.0 |
| Dried molasses | 0.025 |
| Salt | 1.86 |
| Calcium carbonate | 3.27 |
| Dicalcium phosphate | 1.57 |
| Vitamins/trace minerals | 0.615 |

A comparative concentrate composition, C2, was made by dry mixing and pelleting the following ingredients:

| Ingredient | % |
| --- | --- |
| Wheat middlings | 35.0 |
| Blood meal | 12.6 |
| Meat and bone meal | 0.24 |
| Malt sprouts | 11.67 |
| Soybean meal (48% protein) | 14.29 |
| Distillers grains w/solubles | 10.0 |
| Corn gluten meal | 5.37 |
| Animal fat | 5.82 |
| Salt | 0.64 |
| Calcium carbonate | 2.08 |
| Magnesium oxide | 0.43 |
| Dicalcium phosphate | 1.24 |
| Vitamins/trace minerals | 0.62 |

The two compositions were fed to dairy cattle in rations based on corn, corn silage, alfalfa hay, alfalfa haylage and appropriate minerals that were properly balanced according to accepted standards. Performance of these cattle was monitored from the time they were approximately 17 days in milk to approximately 149 days in milk. As can be seen in Table 3, the composition increases milk production over other feeds.

TABLE 3

| Treatment | Approximate Days in Milk | | | | | |
| --- | --- | --- | --- | --- | --- | --- |
| | 17-37 | 38-65 | 66-93 | 94-121 | 122-149 | O.A. |
| B | 77.2 | 81.4 | 77.4 | 73.8 | 69.3 | 75.5 |
| C2 | 85.0 | 89.3 | 84.8 | 77.0 | 74.9 | 81.5 |
| Advantage | 7.8 | 7.9 | 7.4 | 3.2 | 5.6 | 6.0 |

The following, Examples 3-18, are examples of feed formulations that, when properly applied, meet the essential amino acid requirements of high producing dairy cows from the combination of microbial essential amino acids, as determined by application of the method of Tilley and Terry, and undegraded essential amino acids as estimated by the techniques of Craig and Broderick.

EXAMPLE 3

A complete feed form composition was prepared by admixing the following ingredients in the following amounts: 55.39 weight percent corn, 20 weight percent wheat middlings, 3.67 weight percent soybean hulls, 0.25 weight percent soybean meal (48% protein), 0.88 weight percent salt, 1.82 weight percent fat, 1.88 weight percent calcium carbonate, 5.0 weight percent distillers grains with solubles, 7.28 weight percent blood meal, 0.99 weight percent dicalcium phosphate, 2.49 weight percent corn gluten meal, 0.23 weight percent magnesium oxide, 0.12 weight percent vitamins and trace minerals.

EXAMPLE 4

A complete feed form composition was prepared by admixing the following ingredients in the following amounts: 43.38 weight percent corn, 25.4 weight percent wheat middlings, 10.0 weight percent soybean hulls, 0.25 weight percent soybean meal (48% protein), 0.88 weight percent salt, 1.91 weight percent fat, 1.80 weight percent calcium carbonate, 5.0 weight percent distillers grains with solubles, 7.43 weight percent blood meal, 0.79 weight percent dicalcium phosphate, 2.81 weight percent corn gluten meal, 0.22 weight percent magnesium oxide, 0.13 weight percent vitamins and trace minerals.

EXAMPLE 5

A complete feed form composition was prepared by admixing the following ingredients in the following amounts: 26.14 weight percent corn, 42.64 weight percent wheat middlings, 10.00 weight percent soybean hulls, 0.25 weight percent soybean meal (48% protein), 0.87 weight percent salt, 1.86 weight percent fat, 2.0 weight percent calcium carbonate, 5.0 weight percent distillers grains with solubles, 7.67 weight percent blood meal, 0.28 weight percent dicalcium phosphate, 3.01 weight percent corn gluten meal, 0.15 weight and trace minerals.

EXAMPLE 6

A complete feed form composition was prepared by admixing the following ingredients in the following amounts: 11.0 weight percent corn, 50.0 weight percent wheat middlings, 10.0 weight percent soybean hulls, 7.72 weight percent malt sprouts, 0.25 weight percent soybean meal (48% protein), 0.58 weight percent salt, 2.66 weight percent fat, 2.13 weight percent calcium carbonate, 5.0 weight percent distillers grains with solubles, 7.45 blood meal, 2.95 weight percent corn gluten meal, 0.14 weight percent magnesium oxide, 0.12 vitamins and trace minerals.

EXAMPLE 7

A complete feed form composition was prepared by admixing the following ingredients in the following amounts: 4.96 weight percent corn, 50.0 weight percent wheat middlings, 10.0 weight percent soybean hulls, 1.77 weight percent soybean meal (48% protein), 0.59 weight percent salt, 2.0 weight percent fat, 2.41 weight percent calcium carbonate, 19.0 weight percent distillers grains with solubles, 7.48 blood meal, 1.53 weight percent corn gluten, meal 0.11 weight percent magnesium oxide, 0.15 weight percent vitamins and trace minerals.

EXAMPLE 8

A complete feed form composition was prepared by admixing the following ingredients in the following amounts: 7.22 weight percent corn, 39.50 weight percent wheat middlings, 10.0 weight percent soybean hulls, 22.47 weight percent malt sprouts, 0.25 weight percent soybean meal (48% protein), 0.51 weight percent salt, 3.47 weight percent fat, 2.01 weight percent calcium carbonate, 5.09 weight percent distillers grains with solubles, 6.67 weight percent blood meal, 2.51 weight percent corn gluten meal, 0.21 weight percent magnesium oxide, 0.09 weight percent vitamins and trace minerals.

EXAMPLE 9

A concentrate form composition was prepared by admixing the following ingredients in the following amounts: 22.86 weight percent wheat middlings, 2.5 weight percent meat and bone meal, 10.0 weight percent malt sprouts, 3.39 weight percent soybean meal (48% protein), 0.72 weight percent salt, 5.51 weight percent fat, 1.62 weight percent calcium carbonate, 15.0 weight percent distillers grains with solubles, 21.5 weight percent blood meal, 1.22 weight percent dicalcium phosphate, 14.63 weight percent corn gluten meal, 0.43 weight percent magnesium oxide, and 0.62 weight percent vitamins and trace minerals.

EXAMPLE 10

A concentrate form composition was prepared by admixing the following ingredients in the following amounts: 18.0 weight percent wheat middlings, 3.5 weight percent meat and bone meal, 6.56 weight percent malt sprouts, 7.03 weight percent soybean meal (48% protein), 0.71 weight percent salt, 5.60 weight percent fat, 1.32 weight percent calcium carbonate, 10.0 weight percent distillers grains with solubles, 26.94 weight percent blood meal, 1.30 weight percent dicalcium phosphate, 18.00 weight percent corn gluten meal, 0.42 weight percent magnesium oxide, and 0.62 weight percent vitamins and trace minerals.

EXAMPLE 11

A concentrate form composition was prepared by admixing the following ingredients in the following amounts: 40.56 weight percent wheat middlings, 2.5 weight percent meat and bone meal, 11.67 weight percent soybean meal (48% protein), 0.81 weight percent salt, 5.32 weight percent fat, 1.91 weight percent calcium carbonate, 15.0 weight percent distillers grains with solubles, 10.5 weight percent blood meal, 0.78 weight percent dicalcium phosphate, 10.00 weight percent corn gluten meal, 0.33 weight percent magnesium oxide, and 0.62 weight percent vitamins and trace minerals.

EXAMPLE 12

A concentrate form composition was prepared by admixing the following ingredients in the following amounts: 20.0 weight percent wheat middlings, 3.0 weight percent meat and bone meal, 11.31 weight percent corn gluten meal, 15.81 weight percent soybean meal (48% protein), 0.88 weight percent salt, 5.47 weight percent fat, 1.62 weight percent calcium carbonate, 15.0 weight percent distillers grains with solubles, 13.0 weight percent blood meal, 0.95 weight percent dicalcium phosphate, 12.00 weight percent corn gluten meal, 0.35 weight percent magnesium oxide, and 0.61 weight percent vitamins and trace minerals.

EXAMPLE 13

A concentrate form composition was prepared by admixing the following ingredients in the following amounts: 48.72 weight percent wheat middlings, 2.5 weight percent meat and bone meal, 10.0 weight percent malt sprouts, 4.34 weight percent soybean meal (48% protein), 0.76 weight percent salt, 2.22 weight percent calcium carbonate, 12.55 weight percent distillers grains with solubles, 11.34 weight percent blood meal, 0.80 weight percent dicalcium phosphate, 6.0 weight percent corn gluten meal, 0.32 weight percent magnesium oxide, and 0.45 weight percent vitamins and trace minerals.

EXAMPLE 14

A blender form composition was prepared by admixing the following ingredients in the following amounts: 29.85 weight percent corn, 32.23 weight percent wheat middlings, 1.04 weight percent salt, 3.01 weight percent fat, 2.36 weight percent calcium carbonate, 10.00 weight percent distillers grains with solubles, 13.5 weight percent blood meal, 2.34 weight percent dicalcium phosphate, 5.0 weight percent corn gluten meal, 0.43 weight percent magnesium oxide, and 0.24 weight percent vitamins and trace minerals.

EXAMPLE 15

A base mix form composition was prepared by admixing the following ingredients in the following amounts: 16.87 weight percent wheat middlings, 3.78 weight percent fat, 1.34 weight percent calcium carbonate, 10.0 weight percent distillers grains with solubles, 43.0 weight percent blood meal, 2.27 weight percent dicalcium phosphate, 21.5 weight percent corn gluten meal, and 1.24 weight percent vitamins and trace materials.

EXAMPLE 16

A base mix form composition was prepared by admixing the following ingredients in the following amounts: 20.35 weight percent wheat middlings, 0.63 weight percent fat, 10.0 weight percent distillers grains with solubles, 53.53 weight percent blood meal, and 15.49 weight percent corn gluten meal.

EXAMPLE 17

Synthetic amino acids that are protected against degradation in the rumen, yet are available for absorption in the lower gut may also be used in the current invention. For example, such a product may contain 70% lysine in a carrier that protects 80% of that lysine from degradation in the rumen yielding a content of 254 grams/lb. of undegraded lysine. A concentrate form composition could be prepared using this ingredient by admixing the following ingredients in the following amounts: 33.88 weight percent wheat middlings, 2.5 weight percent meat and bone meal, 10.0 weight percent malt sprouts, 7.52 weight percent soybean meal (48% protein), 0.75 weight percent salt, 5.83 weight percent fat, 2.08 weight percent calcium carbonate, 19.0 weight percent distillers grains with solubles, 11.71 weight percent blood meal, 1.22 weight percent dicalcium phosphate, 4.46 weight percent corn gluten meal, 0.38 weight percent magnesium oxide, 0.22 weight percent protected lysine and 0.45 weight percent vitamins and trace minerals.

EXAMPLE 18

Methods exist to treat proteinaceous ingredients to reduce their degradability in the rumen. Soybean meal is the most common ingredient treated in this manner. If 60% protection of soybean meal could be achieved, concentrate form composition could be prepared using this ingredient by admixing the following ingredients in the following amounts: 34.64 weight percent wheat middlings, 2.5 weight percent meat and bone meal 10.0 weight percent malt sprouts, 7.27 weight percent treated soybean meal (48% protein), 0.75 weight percent salt, 5.82 weight percent fat, 2.08 weight percent calcium carbonate, 19.0 weight percent distillers grains with solubles, 12.26 weight percent blood meal, 1.21 weight percent dicalcium phosphate, 3.64 weight percent corn gluten meal, 0.38 weight percent magnesium oxide, and 0.45 weight percent vitamins and trace minerals.

What is claimed is:

1. A method of increasing milk production in dairy cattle comprising feeding dairy cattle a complete feed composition which delivers to the abomasum between about 0.92 to about 5.7 grams/lb. feed of undegraded lysine; about 0.16 to about 2.2 grams/lb. feed of undegraded methionine; about 0.42 to about 3.0 grams/lb. feed of undegraded histadine and about 0.70 to about 5.5 grams/lb. feed of undegraded phenylalanine, in order to provide an improved balance of microbial amino acids and amino acids not degraded in the rumen so as to meet the cow's amino acid requirements.

2. The method of claim 1 wherein the amino acids which are not degraded in the rumen are synthetic amino acids or are mixtures of synthetic and natural amino acids.

3. The method of claim 2 wherein the amino acids that are not degraded in the rumen are obtained from ruminally protected proteins such as treated soybean meal.

4. A method of increasing milk production in dairy cattle comprising feeding dairy cattle a concentrate feed composition which delivers to the abomasum between about 3.2 to about 8.2 grams/lb. feed of undegraded lysine; about 0.9 to about 2.8 grams/lb. feed of undegraded methionine; about 1.3 to about 5.9 grams/lb. feed of undegraded histidine and about 2.5 to about 9.0 grams/lb. feed of undegraded phenylalanine, in order to provide an improved balance of microbial amino acids and amino acids not degraded in the rumen so as to meet the cow's amino acid requirements.

5. The method of claim 4 wherein the amino acids which are not degraded in the rumen are synthetic amino acids or are mixtures of synthetic and natural amino acids.

6. The method of claim 5 wherein the amino acids that are not degraded in the rumen are obtained from ruminally protected proteins such as treated soybean meal.

7. A method of increasing milk production in dairy cattle comprising feeding dairy cattle a blender feed composition which delivers to the abomasum between about 3.3 to about 4.0 grams/lb. feed of lysine; about 0.9 to about 1.5 grams/lb. feed of undegraded methionine; about 1.4 to about 2.9 grams/lb. feed of undegraded histidine and about 2.5 to about 4.2 grams/lb. feed of undegraded phenylalaniine, in order to provide an improved balance of microbial amino acids and amino acids not degraded in the rumen so as to meet the cow's amino acid requirements.

8. The method of claim 7 wherein the amino acids which are not degraded in the rumen are synthetic amino acids or are mixtures of synthetic and natural amino acids.

9. The method of claim 8 wherein the amino acids that are not degraded in the rumen are obtained from ruminally protected proteins such as treated soybean meal.

10. A method of increasing milk production in dairy cattle comprising feeding dairy cattle a base mix feed composition which delivers to the abomasum between about 6.7 to about 17.0 grams/lb. feed of undegraded lysine; about 1.6 to about 5.1 grams/lb. feed of undegraded methionine; about 2.6 to about 9.5 grams/lb. feed of undegraded histidine and about 4.7 to about 14.8 grams/lb. feed of undegraded phenylalanine, in order to provide an improved balance of microbial amino acids and amino acids not degraded in the rumen so as to meet the cow's amino acid requirements.

11. The method of claim 10 wherein the amino acids which are not degraded in the rumen are synthetic amino acids or are mixtures of synthetic and natural amino acids.

12. The method of claim 11 wherein the amino acids that are not degraded in the rumen are obtained from ruminally protected proteins such as treated soybean meal.

13. The method of claims 1, 4, 7 or 10 wherein the feed contains trace minerals selected from the group consisting of cobalt, copper, iodine, iron, manganese, selenium and zinc.

14. The method of claims 1, 4, 7 or 10 wherein the feed contains vitamins A, D and E.

15. The method of claims 1, 4, 7 or 10 wherein the feed contains macro minerals selected from the group consisting of calcium, phosphorus, magnesium, potassium, sodium, chloride and sulfur.

16. A method of increasing milk production in dairy cattle by supplying a feed that, along with microbial amino acid flow, delivers from about 69 to about 332 grams/day of lysine, about 20 to about 105 grams/day of methionine, about 22 to about 113 grams/day of histidine and about 44 to about 225 grams/day of phenylalanine, according to the cow's milk production and body weight.

* * * * *